(12) United States Patent
Li et al.

(10) Patent No.: US 12,707,462 B2
(45) Date of Patent: Aug. 11, 2026

(54) METHOD, APPARATUS AND COMPUTER PROGRAM

(71) Applicant: NOKIA TECHNOLOGIES OY, Espoo (FI)

(72) Inventors: Zexian Li, Espoo (FI); Klaus Ingemann Pedersen, Aalborg (DK); Abolfazl Amiri, Aalborg (DK); Carlos Santiago Morejón García, Aalborg (DK); Boyan Yanakiev, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 19/281,195

(22) Filed: Jul. 25, 2025

(65) Prior Publication Data

US 2025/0358813 A1 Nov. 20, 2025

Related U.S. Application Data

(63) Continuation of application No. 19/196,937, filed on May 2, 2025, which is a continuation of application No. PCT/EP2022/080717, filed on Nov. 3, 2022.

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS 11,464,005 B2 10/2022 Babaei et al.
2013/0121260 A1* 5/2013 Mukherjee ........ H04W 72/0466 370/329

(Continued)

FOREIGN PATENT DOCUMENTS

DE 102021112-5778 A1 4/2022
EP 2554001 B1 11/2017

(Continued)

OTHER PUBLICATIONS

"3rd Generation Partnership Project; Technical Specification Group Radio Access Network; NR; Medium Access Control (MAC) protocol specification (Release 17)", 3GPP TS 38.321 v17.2.0, (Sep. 2022), 246 pages.

(Continued)

*Primary Examiner* — Rafael Pérez-Gutiérrez
*Assistant Examiner* — Frank E Donado
(74) *Attorney, Agent, or Firm* — ALSTON & BIRD LLP

(57) ABSTRACT

There is provided an apparatus comprising at least one processor and at least one memory storing instructions that, when executed by the at least one processor, cause the apparatus at least to receive, from an access node, an information indicating configured grant uplink resources for performing uplink data transmission to the access node; receive, from the access node, configuration information indicating a number of bits; transmit, to the access node, a dynamic indication comprising a bitmap of a length specified by the number of bits indicated by the configuration information, said bitmap indicating subsequent configured grant uplink resources which the apparatus will not use as unused configured uplink grant resources; and transmit, to the access node, a new dynamic indication, wherein the new dynamic indication cannot claim back unused configured grant uplink resources.

27 Claims, 8 Drawing Sheets

(56) References Cited

U.S. PATENT DOCUMENTS

| | | | | |
|---|---|---|---|---|
| 2019/0306835 | A1* | 10/2019 | Hoang | H04W 72/53 |
| 2020/0359409 | A1 | 11/2020 | Karaki et al. | |
| 2021/0219166 | A1* | 7/2021 | Morozov | H04W 24/10 |
| 2021/0219331 | A1* | 7/2021 | Huang | H04W 72/1273 |
| 2021/0298065 | A1 | 9/2021 | Awoniyi-Oteri et al. | |
| 2021/0392654 | A1* | 12/2021 | Lin | H04W 76/14 |
| 2022/0132533 | A1* | 4/2022 | Taherzadeh Boroujeni | H04L 5/1469 |
| 2022/0132544 | A1 | 4/2022 | Elshafie et al. | |
| 2022/0174741 | A1* | 6/2022 | Myung | H04W 74/0866 |
| 2023/0103547 | A1* | 4/2023 | Ohta | H04W 76/15 370/329 |
| 2024/0147478 | A1* | 5/2024 | Babaei | H04W 72/21 |

FOREIGN PATENT DOCUMENTS

| | | | |
|---|---|---|---|
| EP | 3482595 | B1 | 9/2021 |
| EP | 3834347 | B1 | 4/2024 |
| WO | 2020/223420 | A1 | 11/2020 |
| WO | 2020/227218 | A1 | 11/2020 |
| WO | 2020/239246 | A1 | 12/2020 |
| WO | 2022/015121 | A1 | 1/2022 |
| WO | 2022/031718 | A1 | 2/2022 |
| WO | 2022/084525 | A1 | 4/2022 |
| WO | 2022/151150 | A1 | 7/2022 |
| WO | 2022/155125 | A1 | 7/2022 |
| WO | 2024/026756 | A1 | 2/2024 |

OTHER PUBLICATIONS

"3rd Generation Partnership Project; Technical Specification Group Radio Access Network; NR; Multiplexing and channel coding (Release 17)", 3GPP TS 38.212 v17.3.0, (Sep. 2022), 201 pages.

"3rd Generation Partnership Project; Technical Specification Group Radio Access Network; NR; Physical layer procedures for control (Release 17)", 3GPP TS 38.213 v17.3.0, (Sep. 2022), 260 pages.

"3rd Generation Partnership Project; Technical Specification Group Radio Access Network; NR; Physical layer procedures for data (Release 17)", 3GPP TS 38.214 v17.3.0, (Sep. 2022), 232 pages.

"3rd Generation Partnership Project; Technical Specification Group Radio Access Network; NR; Radio Resource Control (RRC) protocol specification (Release 17)", 3GPP TS 38.331 v17.2.0, (Sep. 2022), 1298 pages.

"3rd Generation Partnership Project; Technical Specification Group Radio Access Network; Study on XR (Extended Reality) Evaluations for NR (Release 17)", 3GPP TR 38.838 v17.0.0, (Dec. 2021), 272 pages.

Ericsson, "Moderator Summary #1—Study on XR Specific Capacity Improvements", 3GPP TSG-RAN WG1 Meeting #110bis-e, R1-2210410, (Oct. 10-19, 2022), 143 pages.

Ericsson, "Moderator Summary #2—Study on XR Specific Capacity Improvements", 3GPP TSG-RAN WG1 Meeting #110bis-e, R1-2210411, (Oct. 10-19, 2022), 89 pages.

Ericsson, "Moderator Summary #3—Study on XR Specific Capacity Improvements", 3GPP TSG-RAN WG1 Meeting #110bis-e, R1-210412, (Oct. 10-19, 2022), 99 pages.

Huawei et al., "Transmission with configured grant in NR unlicensed band", 3GPP TSG RAN WG1 Meeting #98bis, R1-1910048, (Oct. 14-20, 2019), 22 pages.

Huawei, et al., "Discussion on XR-specific capacity enhancements techniques", 3GPP Draft, R1-2203132, 3rd Generation Partnership Project (3GPP), Mobile Competence Centre, vol. RAN WGI, No. e-Meeting; May 9, 2022-May 20, 2022 Apr. 29, 2022, XP052143950.

International Search Report and Written Opinion for Patent Cooperation Treaty Application No. PCT/EP2022/080717 dated Apr. 20, 2023, 16 pages.

IPEA/409—International Preliminary Report on Patentability Mailed on May 15, 2025 for WO Application No. PCT/EP22/080717, 8 page(s).

Nokia, "New SID "Study on XR Enhancements for NR"", 3GPP TSG RAN Meeting #94e, RP-213587, (Dec. 6-17, 2021), 5 pages.

Qualcomm Incorporated, "Capacity Enhancement Techniques for XR", 3GPP TSG RAN WG1 #110-bis-e, R1-2210003, (Oct. 10-19, 2022), 17 pages.

Huawei et al., "Discussion on XR-specific capacity enhancements techniques", 3GPP TSG RAN WG1 Meeting #110bis-e, R1-2208421, (Oct. 10-19, 2022), 15 pages.

Notice of Reasons for Refusal for Japanese Application No. 2025-525743 dated Apr. 2, 2026, 7 pages.

Office Action for Canadian Application No. 3,272,676 dated May 12, 2026, 4 pages.

* cited by examiner

METHOD, APPARATUS AND COMPUTER PROGRAM

CROSS-REFERENCE TO RELATED APPLICATIONS

This application is a continuation of U.S. application Ser. No. 19/196,937, filed May 2, 2025, which is a continuation of International Application No. PCT/EP2022/080717, filed Nov. 3, 2022, the entire contents of which are incorporated herein by reference.

FIELD

The present application relates to a method, apparatus, system and computer program and in particular but not exclusively to configured grant resource allocation and signaling.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving from an access node, an information indicating configured grant uplink resources for performing uplink data transmission to the access node; receiving from the access node, configuration information indicating a number of bits; transmitting, to the access node, a dynamic indication comprising a bitmap of a length specified by the number of bits indicated by the configuration information, said bitmap indicating subsequent configured grant uplink resources which the apparatus will not use as unused configured uplink grant resources; and transmitting, to the access node, a new dynamic indication, wherein the new dynamic indication cannot claim back unused configured grant uplink resources.

According to an aspect, there is provided an apparatus comprising means for: transmitting, to a user equipment, an information indicating configured grant uplink resources for the user equipment to perform uplink data transmission to the access node; transmitting, to the user equipment, configuration information indicating a number of bits; receiving, from the user equipment, a dynamic indication comprising a bitmap of a length specified by the number of bits indicated by the configuration information, said bitmap indicating subsequent configured grant uplink resources which the user equipment will not use as unused configured uplink grant resources; and receiving, from the user equipment, a new dynamic indication, wherein the new dynamic indication cannot claim back unused configured grant uplink resources.

According to an aspect, there is provided an apparatus comprising at least one processor and at least one memory storing instructions that, when executed by the at least one processor, cause the apparatus at least to: receive, from an access node, an information indicating configured grant uplink resources for performing uplink data transmission to the access node; receive, from the access node, configuration information indicating a number of bits; transmit, to the access node, a dynamic indication comprising a bitmap of a length specified by the number of bits indicated by the configuration information, said bitmap indicating subsequent configured grant uplink resources which the apparatus will not use as unused configured uplink grant resources; and transmit, to the access node, a new dynamic indication, wherein the new dynamic indication cannot claim back unused configured grant uplink resources.

According to an aspect, there is provided an apparatus comprising at least one processor and at least one memory storing instructions that, when executed by the at least one processor, cause the apparatus at least to: transmit, to a user equipment, an information indicating configured grant uplink resources for the user equipment to perform uplink data transmission to the access node; transmit, to the user equipment, configuration information indicating a number of bits; receive, from the user equipment at the access node, a dynamic indication comprising a bitmap of a length specified by the number of bits indicated by the configuration information, said bitmap indicating subsequent configured grant uplink resources which the user equipment will not use as unused configured uplink grant resources; and receive, from the user equipment, a new dynamic indication, wherein the new dynamic indication cannot claim back unused configured grant uplink resources.

According to an aspect, there is provided a method comprising, by a user equipment: receiving, from an access node, an information indicating configured grant uplink resources for performing uplink data transmission to the access node; receiving, from the access node, configuration information indicating a number of bits; transmitting, to the access node, a dynamic indication comprising a bitmap of a length specified by the number of bits indicated by the configuration information, said bitmap indicating subsequent configured grant uplink resources which the user equipment will not use as unused configured uplink grant resources; and transmitting, to the access node, a new dynamic indication, wherein the new dynamic indication cannot claim back unused configured grant uplink resources.

According to an aspect, there is provided a method comprising, by an access node: transmitting, to a user equipment, an information indicating configured grant uplink resources for the user equipment to perform uplink data transmission to the access node; transmitting, to the user equipment, configuration information indicating a number of bits; receiving, from the user equipment, a dynamic indication comprising a bitmap of a length specified by the number of bits indicated by the configuration information, said bitmap indicating subsequent configured grant uplink resources which the user equipment will not use as unused configured uplink grant resources; and receiving, from the user equipment, a new dynamic indication, wherein the new dynamic indication cannot claim back unused configured grant uplink resources.

According to an aspect, there is provided a non-transitory computer readable medium comprising instructions which, when executed by an apparatus, cause the apparatus to perform at least the following: receiving, from an access node, an information indicating configured grant uplink resources for performing uplink data transmission to the access node; receiving, from the access node, configuration information indicating a number of bits; transmitting, to the access node, a dynamic indication comprising a bitmap of a length specified by the number of bits indicated by the configuration information, said bitmap indicating subsequent configured grant uplink resources which the apparatus will not use as unused configured uplink grant resources; and transmitting, to the access node, a new dynamic indication, wherein the new dynamic indication cannot claim back unused configured grant uplink resources.

According to an aspect, there is provided a non-transitory computer readable medium comprising instructions which, when executed by an apparatus, cause the apparatus to perform at least the following: transmitting, to a user equipment, an information indicating configured grant uplink resources for the user equipment to perform uplink data transmission to the access node; transmitting, to the user equipment, configuration information indicating a number of bits; receiving, from the user equipment, a dynamic indication comprising a bitmap of a length specified by the number of bits indicated by the configuration information, said bitmap indicating subsequent configured grant uplink resources which the user equipment will not use as unused configured uplink grant resources; and receiving, from the user equipment, a new dynamic indication, wherein the new dynamic indication cannot claim back unused configured grant uplink resources.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above. Additional preferred embodiments are described in the dependent claims.

DESCRIPTION OF FIGURES

Embodiments will now be described, by way of example only, with reference to the accompanying Figures in which.

DETAILED DESCRIPTION

In the following, certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
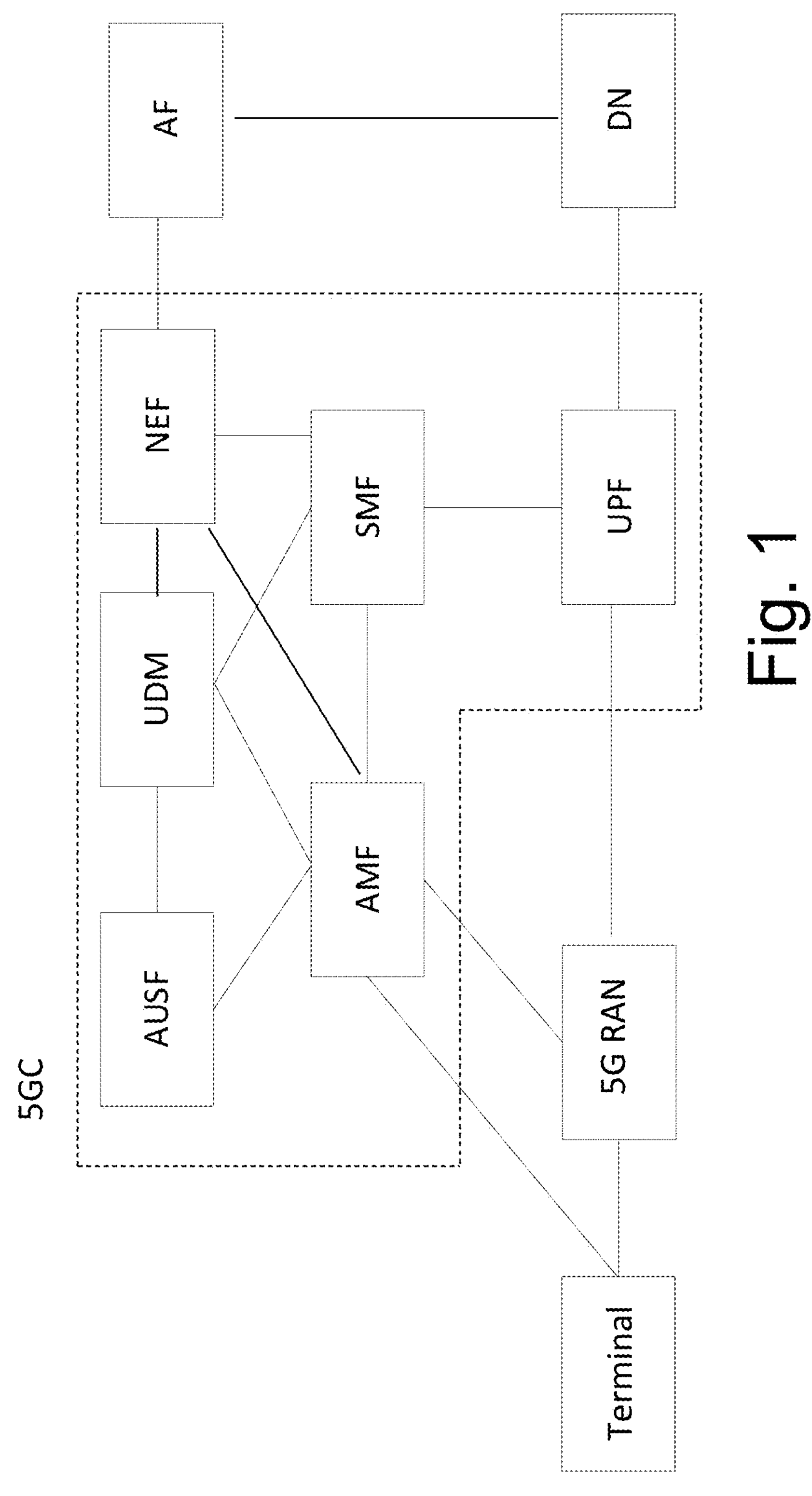
FIG. 1 shows a representation of a network system according to some example embodiments.

FIG. 1 shows a schematic representation of a 5G system (5GS). The 5GS may be comprised by a terminal or user equipment (UE), a 5G radio access network (5G-RAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF). FIG. 1 also shows the various interfaces (N1, N2 etc.) that may be implemented between the various elements of the system.

Figure 2:
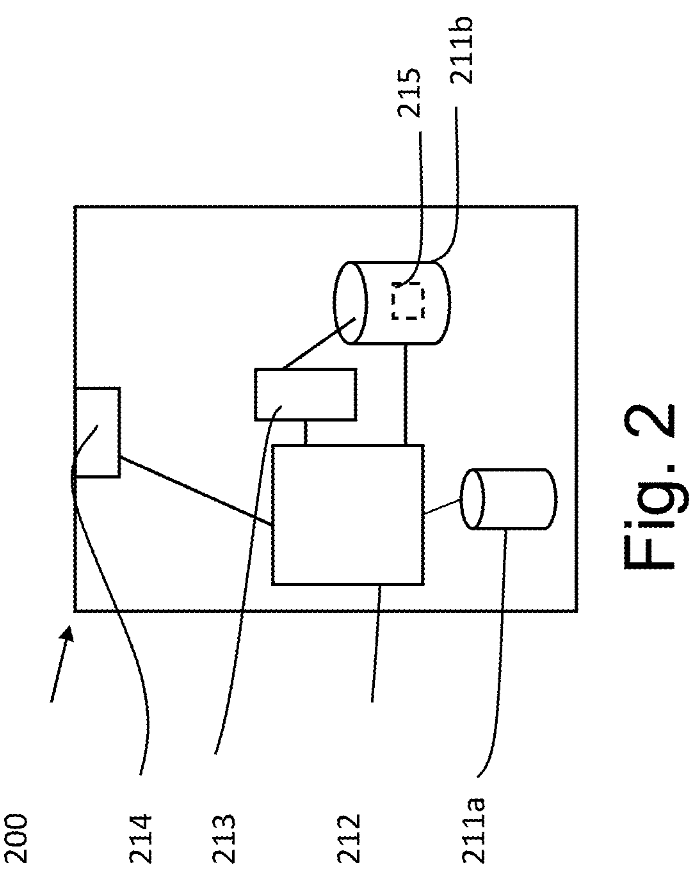
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a,* at least on read only memory (ROM) 211*b,* at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200.

In alternative embodiments, two or more functions of the 5GRAN or the 5GC may share a control apparatus.

Figure 3:
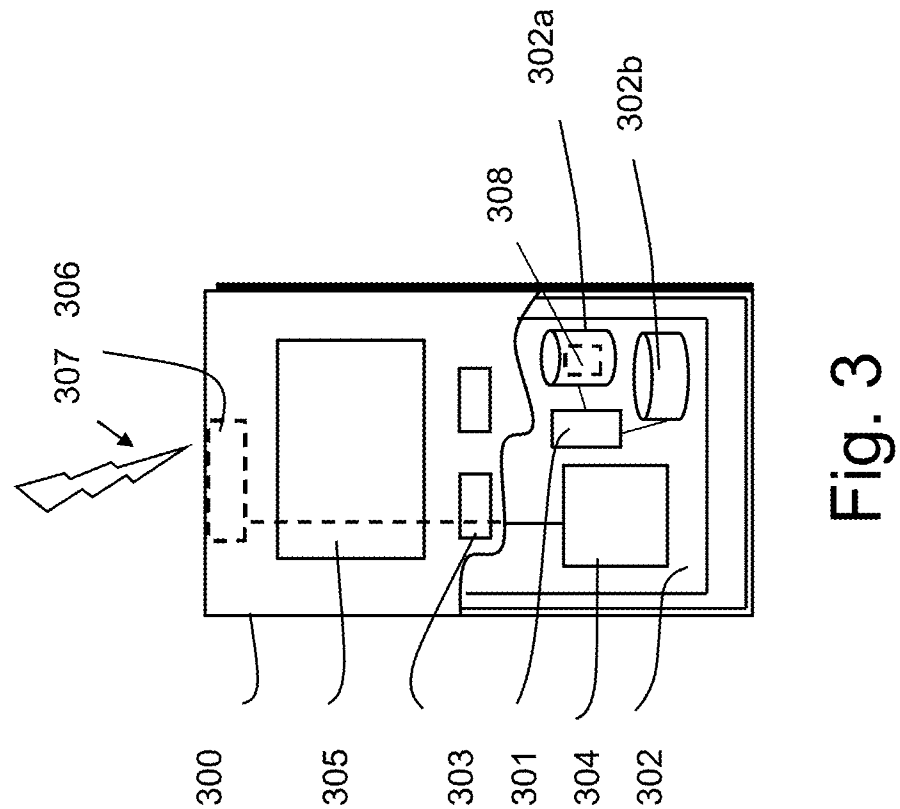
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a,* at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Some examples of the present disclosure may be applied to situations where variability in packet size occurs between uplink transmission occasions.

For example, in some extended reality (XR) applications, different XR packets may have different sizes. XR may include virtual reality (VR), mixed reality (MR) or augmented reality (AR) applications.

To support XR, some network implementations to enhance resource allocation and scheduling, including Semi-persistent Scheduling (SPS) and Configured Grant (CG) enhancements, and Dynamic scheduling/grant enhancements, may be desired to help address the variability in packet size.

CG may refer to a configured scheduling method for the uplink shared channel PUSCH in 5G. Defined resources may be semi-statically scheduled for a device or UE, with various mechanisms for activating and releasing the scheduled resources. This contrasts with dynamic scheduling, where each transmission is scheduled separately by control information (DCI).

To improve transmission capacity of a UE and thereby XR, a single UE can be provided with multiple CG PUSCH transmission occasions within a single CG cycle. Having a CG cycle with multiple PUSCH occasions provides sufficient periodic resources for XR UL data transmission with low signaling overhead. However, reserving multiple transmission opportunities within a CG cycle can lead to unused capacity by the UE, since the occurrence of data for transmission in XR contexts can be very "bursty" with periods of high transmission alternating with periods of low transmission.

The size of a packet may be determined by the given data rates and frame rates, which may be modelled as a random variable following truncated Gaussian distribution with following statistical parameters.

Table 1 (below) gives some of the parameters that may be used for modelling the variable packet size:

TABLE 1 example parameters that may be used for modelling variable packet size

| Parameter | unit | Baseline values for evaluation | Optional values for evaluation for single eye buffer |
|---|---|---|---|
| Mean: M | byte | R × 1e6/F/8 | R × 1e6/F/8 |
| STD | byte | 10.5% of M | 3% of M |
| Max | byte | 150% of M | 109% of M |
| Min | byte | 50% of M | 91% of M |

R: data rate of the flow in Mbps.
F: frame generation rate of the flow in fps.
Note that the mean and STD apply before truncation applies.
Note that the value of R, F depend on application.

Considering the scenario that UL XR frames are carried over CG resources, variable packet size can bring problems since the resource size and MCS may be fixed once the configuration (UL Type 1 CG) and/or the activation (UL Type 2 CG) is done.

Some examples may enhance CG transmission when supporting periodic traffic flows with variable packet sizes. Some examples may enable a UE to dynamically indicate the unused CG Physical Uplink Shared CHannel (PUSCH) resources (or CG PUSCH occasions).

In this context, a CG resource is to be understood as being a frequency resource that is available for uplink transmission by the UE to the network at a particular allocated time.

In this context, dynamic is to be understood as independent of a CG cycle boundary. A dynamic indication is not restricted to an entire CG cycle, and can cover any group of successive transmissions, independent of the CG cycle boundary. A dynamic indication may begin at any resource within a CG cycle, continue for a period that is not linked to the CG cycle size, and optionally cross a cycle boundary between consecutive CG cycles. A dynamic indication can occur at any moment, and not just at the beginning of a CG cycle. The length indicated by a dynamic indication is variable and independent from the length and boundary of a CG cycle. The position and length of a CG cycle may be indicated by RRC parameters timeDomainOffset and periodicity in ConfiguredUplinkGrant IE. Optionally, a dynamic indication can be limited to a single CG cycle. Optionally, a dynamic indication can begin at the beginning of a CG cycle. Summarizing, the placement of the dynamic indication is independent from the boundaries of the CG cycle.

While reference has been made to variable packet sizes in XR applications, it should be understood that examples disclosed herein are not limited to XR applications, and may be applied in other use cases and provide similar advantages outside of XR applications.

In some examples, one or more CG PUSCH resources may not be used due to the variability in packet size. Other situations where CG PUSCH resources may be unused include, for example, packet discarding due to packet delay budget violation or PDU set priority considerations (for example if a base layer frame is discarded or failed, other dependent layers may be obsolete at least for some applications).

Some examples may address the issues of whether and how enhanced CG candidate techniques are necessary and beneficial for improving XR capacity. Some examples may relate to dynamic indication of the unused CG PUSCH occasion(s) or resource(s) by the UE. Some examples may support dynamic indication of the unused CG PUSCH occasion(s) or resource(s) by the UE. Dynamic indication may comprise: Dynamic indication based on CG-Uplink Control Information (UCI); Dynamic indication based on new dedicated UCI; and/or Dynamic indication based on medium access control (MAC) control element (CE).

In some examples, Dynamic indication based on MAC CE may have the problem of MAC CE being lost if the access node (e.g. gNB) cannot decode the first PUSCH carrying Buffer Status Report (BSR) correctly.

On the other hand, with Dynamic indication based on CG-UCI or dedicated UCI, some examples may enable a more robust channel coding to be selected for the UCI transmission. Such examples may bring other benefits compared to Dynamic indication based on MAC CE, for example UCI can be decoded earlier comparing to UL PUSCH, thereby resulting in improvements with respect to latency.

Some examples may implement Dynamic indication based on CG-UCI and/or dedicated UCI to address one or more of the aforementioned issues.

Figure 4A:
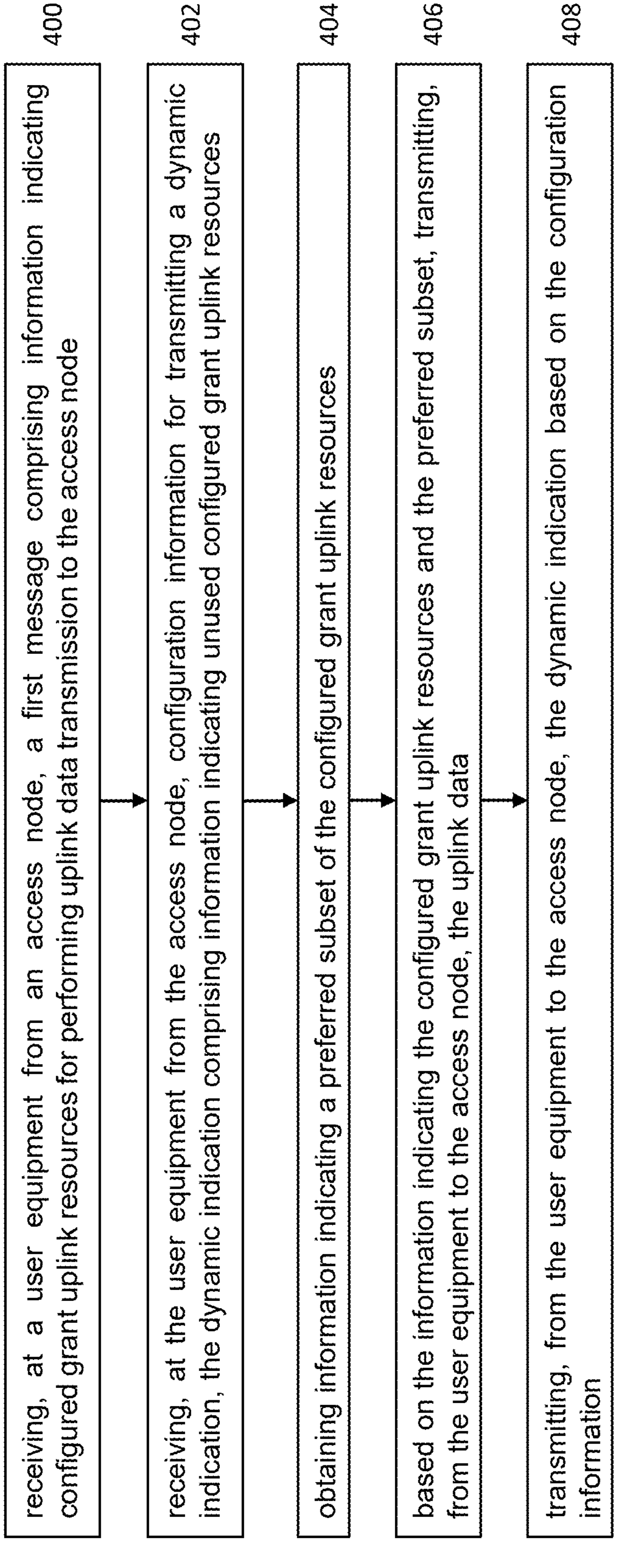
FIGS. 4*a* and 4*b* show methods according to some examples.
Figure 4B:
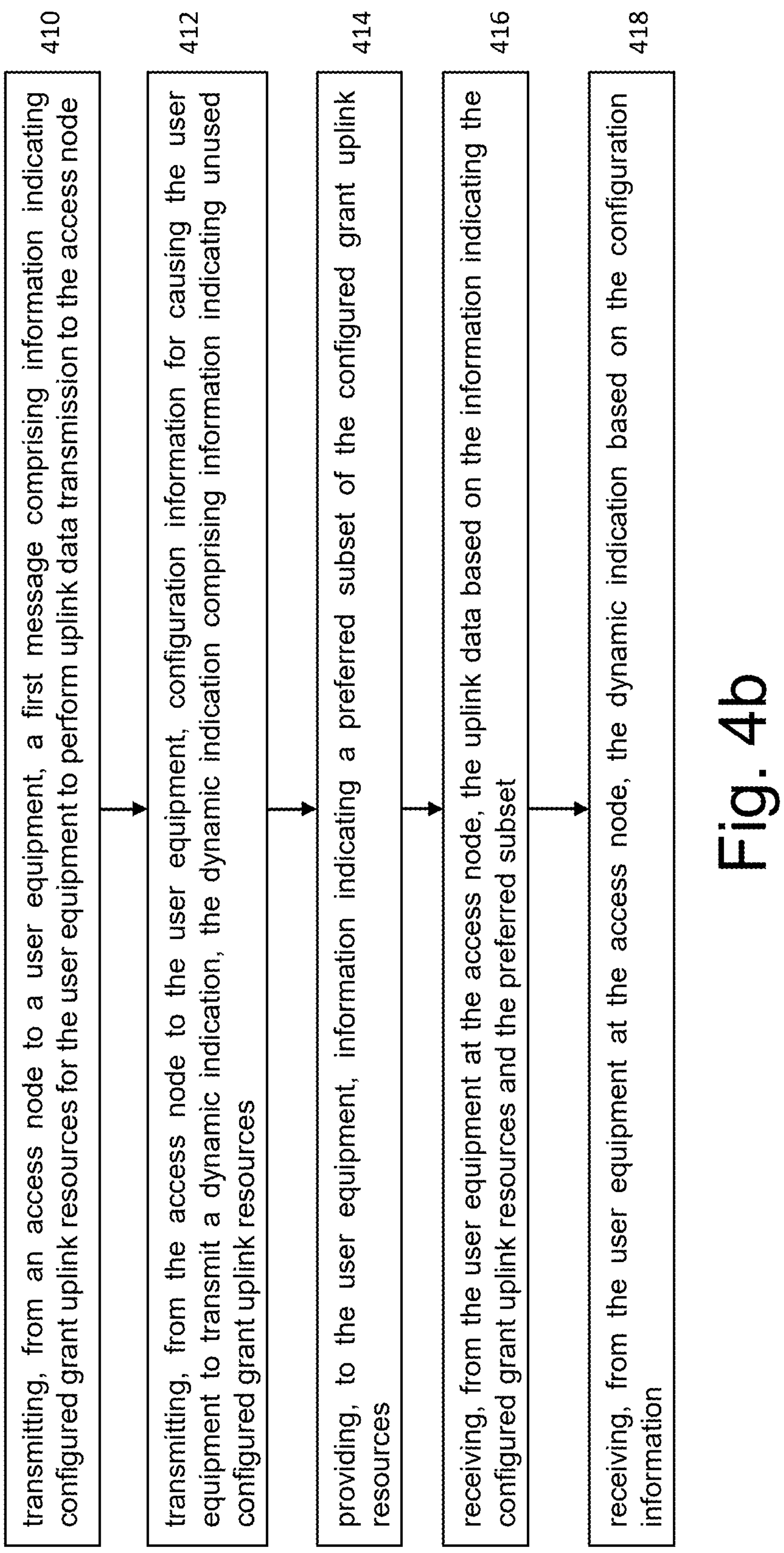

Reference is made to FIGS. 4*a* and 4*b*, which show methods according to some examples. With reference to FIG. 4*a*, at 400, a method comprises receiving, at a user equipment from an access node, a first message comprising information indicating configured grant uplink resources for performing uplink data transmission to the access node.

At 402, the method comprises receiving, at the user equipment from the access node, configuration information for transmitting a dynamic indication, the dynamic indication comprising information indicating unused configured grant uplink resources.

At 404, the method comprises obtaining information indicating a preferred subset of the configured grant uplink resources.

At 406, the method comprises, based on the information indicating the configured grant uplink resources and the preferred subset, transmitting, from the user equipment to the access node, the uplink data.

At 408, the method comprises transmitting, from the user equipment to the access node, the dynamic indication based on the configuration information.

With reference to FIG. 4*b*, at 410 a method comprises transmitting, from an access node to a user equipment, a first message comprising information indicating configured grant uplink resources for the user equipment to perform uplink data transmission to the access node.

At 412, the method comprises transmitting, from the access node to the user equipment, configuration information for causing the user equipment to transmit a dynamic indication, the dynamic indication comprising information indicating unused configured grant uplink resources.

At 414, the method comprises providing, to the user equipment, information indicating a preferred subset of the configured grant uplink resources.

At 416, the method comprises receiving, from the user equipment at the access node, the uplink data based on the information indicating the configured grant uplink resources and the preferred subset.

At 418, the method comprises receiving, from the user equipment at the access node, the dynamic indication based on the configuration information.

In some examples, providing the information indicating the preferred subset may comprise sending, from the access node to the user equipment, the information indicating the preferred subset. In some examples, obtaining the information indicating the preferred subset may comprise receiving, at the user equipment from the access node, the information indicating the preferred subset.

In some examples, the first message may comprise the information indicating the preferred subset. In some examples the configuration information and/or the dynamic information may comprise the information indicating the preferred subset. The preferred subset may be preconfigured, for example by preconfiguring information indicating that the preferred subset does not comprise the last M resources.

In some examples, the content of UCI may comprise one or more of the following fields:

TABLE 2 example CG-UCI fields

| Field | Bitwidth |
|---|---|
| HARQ process number | 4 |
| Redundancy version | 2 |
| New data indicator | 1 |
| Channel Occupancy Time (COT) sharing information | $\lceil \log_2 C \rceil$ if both higher layer parameter ul-toDL-COT-SharingED-Threshold and higher layer parameter cg-COT-SharingList are configured, or if both higher layer parameter ue-SemiStaticChannelAccessConfig and higher layer parameter cg-COT-SharingList are configured, or if higher layer parameter cg-COT-SharingList is configured in frequency range 2-2, where C is the number of combinations configured in cg-COT-SharingList;<br>1 if higher layer parameter ul-toDL-COT-SharingED-Threshold is not configured, and if higher layer parameter ue-SemiStaticChannelAccessConfig is not configured, and if higher layer |

TABLE 2-continued

| example CG-UCI fields | |
|---|---|
| Field | Bitwidth |
| | parameter cg-COT-SharingOffset is configured; 0 otherwise; If a UE indicates COT sharing other than "no sharing" in a CG PUSCH within the UE's initiated COT, the UE may provide consistent COT sharing information in all the subsequent CG PUSCHs, if any, occurring within the same UE's initiated COT such that the same DL starting point and duration are maintained. |

Figure 6:
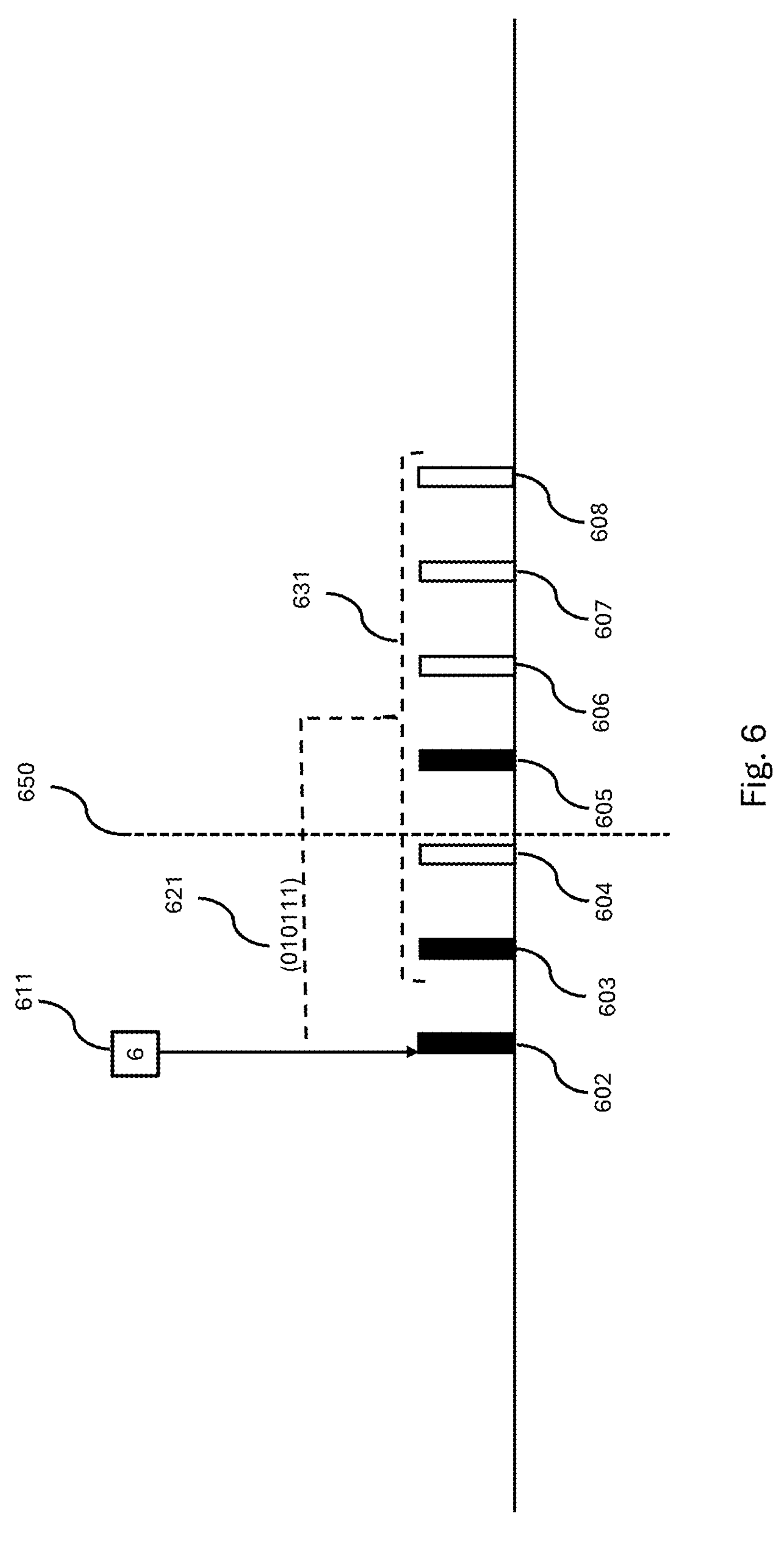
FIG. 6 shows a timing diagram for configured grant resources with an adjustable reporting window.

The interplay between configuration information and a dynamic indication is illustrated in the timing diagram of FIG. 6.

In FIG. 6, a Configured Grant has been set up for a UE, with Configured Grant resources 602 to 608 reserved for uplink data from the UE. The Configured Grant resources 602 to 608 are part of a continuum, with resources before 602 and after 608 that are not shown. Between Configured Grant resources 602 to 608 are spaces or gaps, corresponding to times when the UE does not have allocated uplink resources. During these gaps, another device within the network may be transmitting. The Configured Grant may be defined based on a CG cycle, with a cycle boundary 650 that separates consecutive cycles. Each consecutive cycle contains resources that are reserved for the UE, where the resources are allocated according to a pattern that repeats cycle after cycle. In this example, the cycle boundary 650 is shown between resource 604 and 605. In principle, the placement of the cycle boundary 650 is immaterial to reporting of subsequent unused resources.

Together with a Configured Grant or after the Configured Grant has been set up for a UE, at any time thereafter, an access node (such as a gNB) may provide configuration information 611 to the UE indicating a number of bits to carry the dynamic indication 621. In this context, configuration information 611 may be understood as a request for the UE to indicate whether it intends to use a certain number of its subsequent CG resources. In this example, the configuration information 611 contains the number 6, resulting in the dynamic indication 621 comprising a bitmap having 6 bits. In general, the configuration information 611 may comprise a number between 3 and 8, resulting in the dynamic indication comprising a bitmap having between 3 and 8 bits.

The dynamic indication 621 represents the UE's response to the configuration information 611. As an illustrative example, the dynamic indication 621 is shown in FIG. 6 as being transmitted at CG occasion 602, for instance as part of, or along with, CG transmission 602, for instance as part of UCI sent through PUCCH or multiplexed with the PUSCH payload. The dynamic indication 621 may serve as a label for successive, subsequent CG resources 603 to 608, indicating that the subsequent resources 603 to 608 may be used or will not be unused. For example, the dynamic indication 621 may comprise a bitmap, where a first bit value may indicate that a CG resource may be used by the UE (e.g., "0") and a second bit value may indicate that a CG resource will not be used by the UE (e.g. "1"). But it is equally possible to implement this in reverse, with "1" indicating use and "0" indicating unuse.

According to the example shown, the dynamic indication 621 indicates with the bitmap "(010111)" that subsequent CG resources 603 and 605 will be used for uplink data transmission. The UE's intended use is indicated by the CG resources 603, 605 being colored black. Furthermore, the dynamic indication 621 indicates that the following CG resources 604 and 606 to 608 will not be used by the UE. These CG resources 604 and 606 to 608 are colored white to indicate that the UE does not intend to use these resources for uplink data transmission. So data transmission may take place from the UE during CG resources 602, 603 and 605, whereas no data transmission takes place from the UE during CG resources 604 and 606 to 608. However, any pattern of usage is possible, such as alternating possibly used and unused resources or several unused resources followed by several possibly used resources. Whatever pattern of usage of subsequent CG resources is intended by the UE, this may be reflected in the bitmap of dynamic indication 621.

Some examples may provide a UCI comprising a dynamic indication 621 of which CG PUSCH resource(s) will be taken. The dynamic indication 621 serves as a reporting window 631 for subsequent CG resources 603 to 608. The reporting window 631 can open at any time within a CG cycle, in response to configuration information 611 received from the access node. The UE reacts to receiving the configuration information 611 by populating the specified reporting window 631 with the dynamic indication 621, which may be a bitmap that indicates unused CG occasions within the specified reporting window 631. The UE may send the dynamic indication 621, for example as UCI, to the network, to indicate which CG PUSCH resource(s) the UE may use or will not use.

The reporting window 631 may have a size that can be specified or configured, with the size of the reporting window 631 being specified in the configuration information 611. Due to the size of the reporting window 631 being configurable, the reporting window 631 is an adjustable window.

As the access node may provide configuration information 611 which may cause the UE to return a dynamic indication 621, the access node may control whether or not the UE performs any reporting of unused CG resources.

Figure 7:
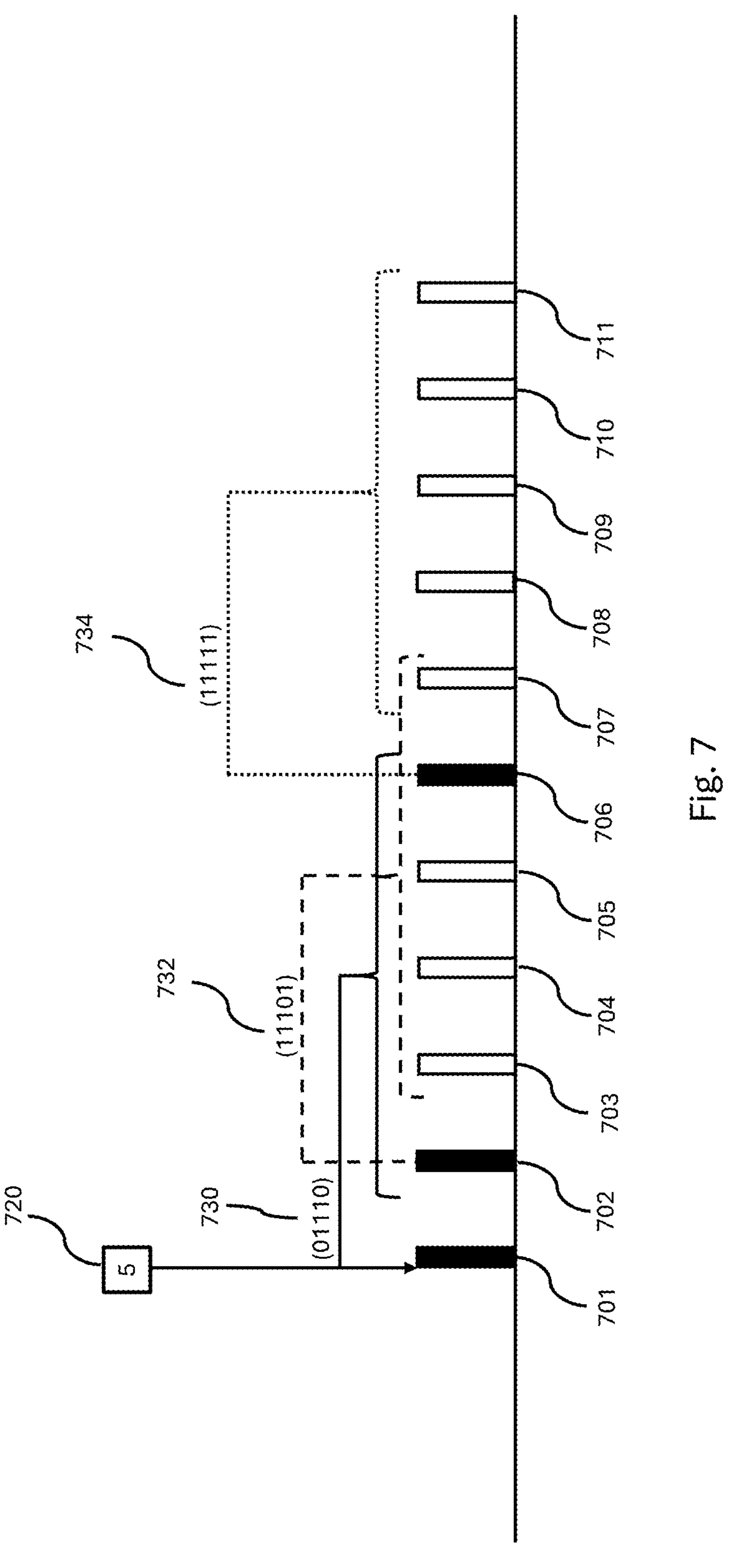
FIG. 7 shows a timing diagram for configured grant resources with a sliding reporting window.

The adjustable window may furthermore be implemented as a sliding window, as described with respect to FIG. 7. Here, there are shown allocated CG resources 701 to 711, comprising data transmissions 701, 702 and 706. According to this, the configuration information 720 may open not just a single reporting window 730, but multiple reporting windows 730, 732, 734 following each data transmission 701, 702, 706.

So the reporting windows 730, 732, 734 are sized based on the most recent configuration information 720. Furthermore, the reporting windows 730, 732, 734 cumulatively form a sliding window, in the sense that the sliding reporting window allows the access node to obtain information about the UE's future data transmission needs at multiple CG resources-namely, at each CG resource during which the UE performs data transmission 701, 702, 706. So the reporting window 730, 732, 734 "slides" through time, and at each CG data transmission, the sliding reporting window provides an updated glimpse into the UE's future data transmission needs.

Before PUSCH CG resource 701, the access node transmits as configuration information 720 the number "5" to the UE. The configuration information 720 indicates the number of bits to carry the subsequent dynamic indications 730, 732, 734. As shown in FIG. 7, the configuration information 720 indicates that for the following CG transmissions 701, 702, 706, the UE should multiplex a dynamic indication 730, 732, 734 in the form of a bitmap, indicating if the UE will not use the corresponding resources to transmit uplink data.

In response to the configuration information 720, the UE sends a first dynamic indication 730 such as "01110", indicating that the UE intends, for the five subsequent CG resources on the PUSCH 702 to 707, not to use resources 703 to 705.

Dynamic indications (bitmaps) 730, 732, 734 may be sent from the UE to the access node in each data transmission 701, 702, 706, e.g., as UCI, without waiting for the next CG cycle to begin. There is no cycle boundary in FIG. 7 because the placement of a CG cycle boundary is immaterial: the dynamic indication simply applies to the subsequent allocated CG resources.

In the example, dynamic indications 730, 732 and 734 are sent at CG resources 701, 702 and 706, respectively. At CG resources 703 to 705 and 707 to 711, the UE will not send a dynamic indication as the UE will not use these resources for data transmission.

This procedure allows the access node to look into the future and see which resources of its CG the UE intends not to use. Upon receipt of the dynamic indication 730, 732, 734, the access node evaluates whether the UE has indicated that it will not use any upcoming PUSCH resources of the CG. At this point, the access node can reallocate these unused PUSCH resources to other UEs in the network or may save power by skipping reception of or not decoding the unused resources. This sliding window approach may reduce complexity and allow efficient signaling and decoding of the information.

As shown in FIG. 7, the first dynamic indication 730 and the second dynamic indication 732 overlap in that they both relate to resources 703 to 706. The UE may be subject to the constraint that it cannot claim back resources that it has already indicated will not be used. So the second dynamic indication 732 may update information on resources 703 to 706 provided in the first dynamic indication 730. Such an update may be performed by overwriting the bitmap transmitted in the first dynamic indication 730. The term overwrite may also be used in case the usage of overlapping CG resources does not change between the first and second dynamic indications 730, 732. The updating of a previous dynamic indication may be subject to the constraint that resources which the UE indicated as unused cannot be claimed back by the UE. Thus, for any unused resources, the UE needs to continue indicating in subsequent dynamic indications that it will continue not using those resources. In the example shown, the UE communicated to the access node in the first dynamic indication 730 that it will not use resources 703 to 705. Thus, the UE also needs to continue indicating in the second dynamic indication 732 that it will not use resources 703 to 705. This is for example illustrated by continuing to indicate "1" for these resources in the second dynamic indication 732.

According to this scheme, it is possible for a UE to release additional CG resources in subsequent dynamic indications, but it is not possible for the UE to claim CG resources back in a subsequent dynamic indication, if they have already been released. This allows the access node to reallocate unused resources to other UEs without risking collisions or other resource allocation problems. At the same time, implementation complexity can be reduced.

When the access node provides configuration information 720 indicating the number of bits to carry the dynamic indication, this may enable the access node to closely control the dynamicity of the resource reallocation in balance with the time extent for which the UE may predict, e.g. based on the current buffer status, whether there will be unused resources in subsequent CG PUSCH resources. This may provide additional flexibility to the access node for the reallocation of resources. The longer the bitmap, the more efficient and flexible the reallocation of the unused resources by the access node, yet the less accurate the prediction of the unused resources by the UE. This might yield an increased latency in UE uplink transmissions, for example in case there is new unexpected uplink traffic coming in and if a resource that has been reported as unused cannot be claimed back by the UE. The shorter the bitmap, the less efficient and flexible the reallocation of the unused resources by the access node, yet the more accurate the prediction by the UE and the shorter the latency for unexpected uplink traffic. In case of a high network load, the access node may prefer a relatively long bitmap to ensure that no resources remain unused, whereas if the network load is low, less planning may be required, and the bitmap may be shorter.

In some examples, the 1$^{st}$ CG PUSCH resource may be used by default. Accordingly, in such examples the length of the indication may be M−1 where M is the total number of configured CG PUSCH resources within one cycle.

In some examples, the UCI configuration may comprise an indication of CG PUSCH resources not to be used.

For example, where there are 6 UL CG PUSCH occasions within one CG cycle, the indication may indicate which or how many of the occasions are not used.

In some examples where the first CG PUSCH resource is used, then 3 bits may be used to indicate how many CG PUSCH resources will not be used in the current CG cycle. Table 3 below shows some example indicator values that may be used to indicate how many resources are not in use.

TABLE 3 example indicator values for different numbers of unused CG PUSCH resource occasions

| | |
|---|---|
| 000 | All resource used |
| 001 | One CG PUSCH resource not used |
| 010 | Two CG PUSCH resources not used |
| 011 | Three CG PUSCH resource not used |
| 100 | Four CG PUSCH resource not used |
| 101 | Five CG PUSCH resource not used |
| 110 | RES |
| 111 | RES |

In some examples, instead of indicating how many CG PUSCH resources are not used, the indicator may be used to indicate how many CG PUSCH resources will be used. In some examples, both UE and gNB may know how many CG PUSCH resources are configured within one CG cycle, and so the indicator indicating how many resources are not used may also indicate how many resources are used, and vice versa.

In some examples, one or more of the reserved "RES" patterns, may be used as an indication that extra UL resources are needed. Based on this, the gNB may allocate UL resource for a dynamic grant (DG) PUSCH transmission and/or may activate an additional CG configuration. Advantageously, in such examples the gNB can assign resources sooner so that the packet delay budget may be met for delay critical services.

In some examples, the proposed configuration can be extended to cover the scenarios with multiple CG configurations.

For example, where the UCI configuration comprises an indication of which CG PUSCH resource(s) will be taken, the indication may be defined to cover the resources of the activated CG configurations within one CG cycle for multiple CG configurations. Similarly, where the UCI configuration comprises an indication of CG PUSCH resources not to be used, the number of unused CG PUSCH resources for the multiple CG configurations.

In some examples, a data packet may not arrive at the beginning of the UL CG resource, for example due to possible jitter.

Some examples may define a specific pattern (e.g. 111 in table 3 above) which may be used in such a scenario. Alternatively, the UE may indicate the CG PUSCH resource that will be occupied in the very 1$^{st}$ CG PUSCH resource and then a later resource usage indication may overwrite the previous indication.

In some examples, the access node may configure the UE with information for performing the dynamic indication. For example, an access node (such as a gNB) may configure the UE with information indicating one or more of the following parameters/rules:

- Number of bits to carry the dynamic indication;
- PHY priority level of the dynamic indication;
  - In some examples a default setting is that the dynamic indication may have the same PHY priority as CG PUSCH, but in other examples the default may be that the dynamic indication can have higher or lower priority than the CG PUSCH.
- Beta-offset for multiplexing the UL UCI with CG PUSCH.
  - In some examples, a default setting is that the beta-offset can be the same as e.g. beta-offset for HARQ-ACK multiplexing with the same PHY priority.
- Repetition of the dynamic indication over multiple CG PUSCH resources/occasions.
- No UL skipping for the first CG PUSCH.
- The resource usage indication coming later can overwrite the previous resource usage indication.

The configuration may be sent by the access node to the UE during CG PUSCH configuration and/or CG PUSCH configuration activation.

In some examples, the configuration may include information indicating a preferred subset of CG resources. For example, the information may indicate a rule for the UE to apply on how the UE may down-select the pre-configured CG resources in case the UE needs fewer resources than available. For example, where 6 UL CG PUSCH resources are configured, the UE may need to use less than 6 UL CG PUSCH resources.

In some examples, the information indicating the preferred subset of CG resources may comprise a bitmap of preferred and non-preferred resources (e.g. "111001" to indicate that REs #1-3 and #6 are preferred and REs #4 and #5 are not preferred), or information indicating that the preferred subset comprises the first N CG PUSCH resources (e.g. a value of "3" may indicate that the first 3 CG PUSCH resources are preferred) or that the last N CG PUSCH resources are not preferred (e.g. a value of "3" may indicate that the last 3 CG PUSCH resources are not preferred).

Continuing with the earlier example where 6 UL CG PUSCH resources are configured, in some examples the configuration may inform the UE which of those to use if only needing 1, 2, 3, 4, or 5 out of those 6 PUSCH resources. This may allow the gNB to e.g., configure UE #1 to use resources 110101 and UE #2 to use resources 101011 if they only need 4 out of the 6 resources, and hence ensure there is a minimum of overlap/collisions between those.

In some examples, a parameter indicating inferred cancelation may be configured. By setting a value of such parameter to for example "3", the parameter may indicate that the last 3 CG PUSCH occasions are not used unless the UE signals otherwise in the first CG occasion. This may allow for a small amount of data saving.

In some examples, the UE may perform data transmission based on the information indicating the preferred subset. In some examples, the UE may use the preferred subset for transmission. For example, where the information indicating the preferred subset comprises a bitmap, such as "111001", the UE may perform transmission using the first, second, third, and sixth CG PUSCH resources, but not the fourth and fifth CG PUSCH resources. Similarly, if the information indicating the preferred subset indicates that the last three CG PUSCH resources are not preferred, the UE may perform transmission using the first, second and third CG PUSCH resources, but not the fourth, fifth and sixth CG PUSCH resources.

In other examples, the UE may not use the preferred subset for transmission, e.g. when the UE needs more CG PUSCH resources, e.g. all CG PUSCH resources, for transmission.

In some examples, PUCCH carrying HARQ-ACK bits may overlap with the dynamic indication. In such examples, the dynamic indication may be jointly coded with HARQ-ACK bits (for example in case HARQ-ACK presented and the PHY priority is the same as the dynamic indication). In some examples, the joint encoding may reuse HARQ-ACK resource element (RE) mapping for the combined indication bits and HARQ-ACK bits. The combined payload can be in the format of concatenated indication bits and HARQ-ACK bits in the format of {indication bits, HARQ-ACK bits} or {HARQ-ACK bits, indication bits}.

In some examples, the dynamic indication may be separately coded with HARQ-ACK bits (for example, in case HARQ-ACK presented, but with different PHY priority as dynamic indication). The applicable channel coding and RE mapping may be dependent on the relative priority between HARQ-ACK and the indication bits.

For example, if the dynamic indication is with high priority, then the encoding may comprise reusing legacy HARQ-ACK coding and RE mapping for the dynamic indication, and reusing legacy Channel State Information (CSI) part 1 coding and RE mapping for multiplexing HARQ-ACK. In case there is a limitation of maximal number of coding chain in the UL (for example there may be a maximum of 3 individual coding chains), CSI Part 2 may in some examples be dropped.

In some examples, there may be no overlapping between PUCCH carrying HARQ-ACK bits and the dynamic indication. In such examples, the dynamic indication bits may be treated with higher priority than CSI and may use similar coding and RE mapping as HARQ-ACK.

It should be understood that the examples described above may be applied to both the Dynamic indication based on CG-UCI; and Dynamic indication based on new dedicated UCI.

Figure 5:
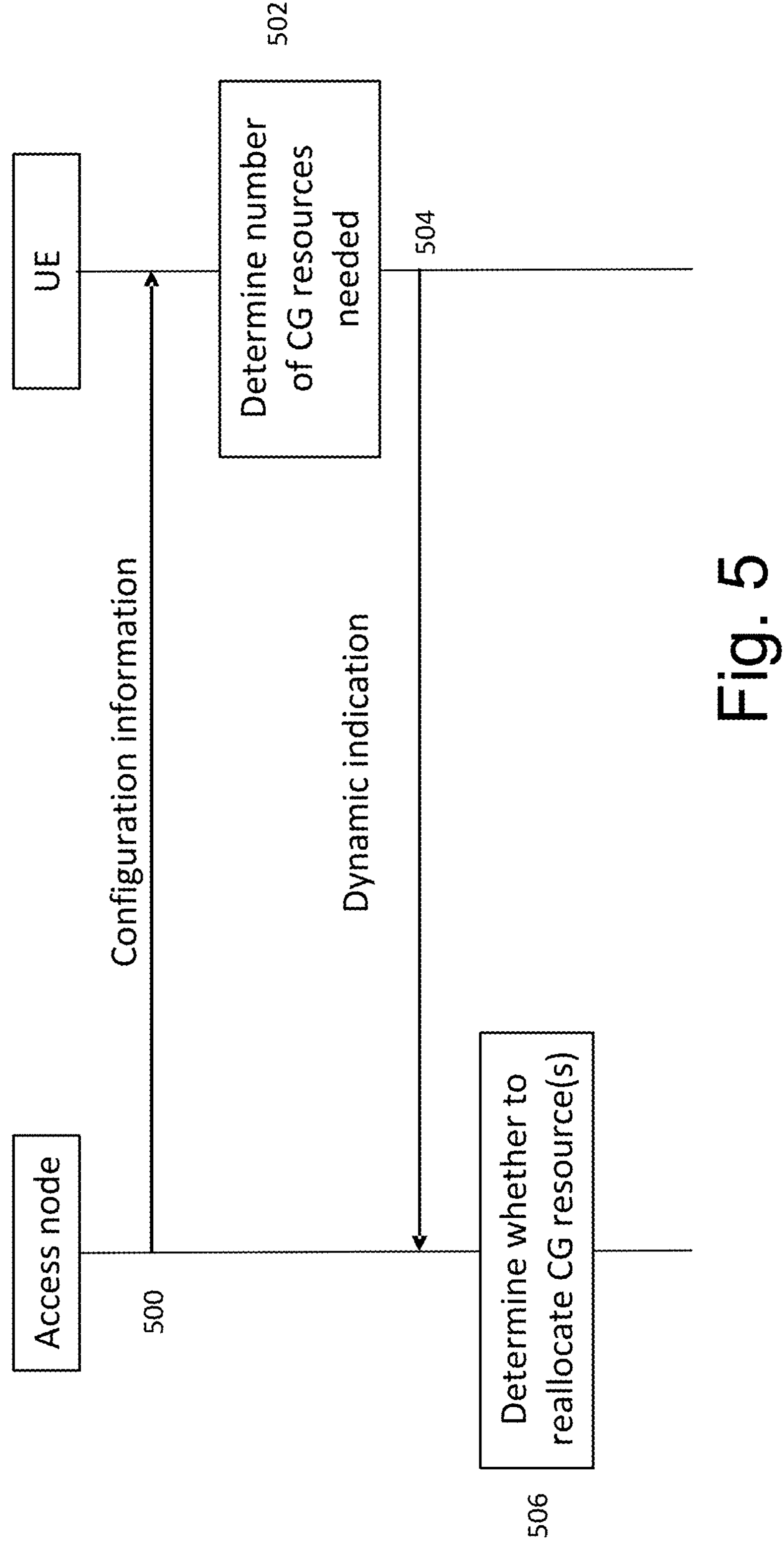
FIG. 5 shows a method according to some examples.

Reference is made to FIG. 5, which shows a method according to some examples.

The example scenario depicted in FIG. 5 may be for a case where multiple PUSCHs are used for one video frame delivery. However, it should be understood that the signaling exchange may be applied to other example use cases. FIG. 5 begins with the assumption that the UE has an uplink data packet ready for transmission before the time of the first CG PUSCH resource.

At 500, the access node (e.g. gNB) provides the UE with configuration information. For example, the access node may configure one or more parameters/rules for reporting the dynamic indication of unused CG PUSCH resources and corresponding UE behaviors related to UL transmission. The configuration information may comprise information indicating that the UE is to use UCI to report the dynamic indication of unused CG PUSCH resources/occasions.

At 502, the UE determines the number of CG resources required for the next data packet.

For example, when the data packet arrives or is ready at the UE side, the UE may determine how many CG PUSCH resources will be used to send the data packet.

In some examples, where the UCI configuration information includes information indicating how the UE may down-select to use a sub-set of the configured resources is enabled, the UE may determine the number of CG resources based on this information.

In some examples, where the UCI configuration information comprises information indicating that implicit cancellation is enabled, the UE may not signal the UCI bits if the uplink data fits exactly into the remaining CG occasions.

At 504, the UE sends the dynamic indication to the access node. The dynamic indication may be as described previously. The dynamic indication may be multiplexed together the CG PUSCH data.

At 506, the access node determines, based on the dynamic indication, whether to reallocate resources for other uses within the CG PUSCH resource cycle/period.

For example, when the access node determines that all the CG PUSCH resources will be used, the access node may continue the reception process. However, when the access node determines that some CG PUSCH resources are not used, the access node can determine whether to reallocate the resource for other usage.

Depending on the deployment scenarios, it might be not possible to re-allocate all the unused resources for other purpose. In the worst case, if there is no sufficient time for the access node to re-schedule unused CG resources, the access node may disable such reporting by e.g., not configurating such operation.

As mentioned above, in FIG. 5 it has been assumed that the UL data is already available before the $1^{st}$ CG PUSCH resource. In some examples where the uplink data is ready after the $1^{st}$ CG PUSCH resource, the UE may still send the dynamic indication and indicate that all the CG resources in the current CG cycle will be used. In a subsequent CG cycle/period, the UE may send a new dynamic indication to overwrite the earlier dynamic indication, if required. The new dynamic indication may be limited to not indicating a smaller number of unused CG PUSCH resources compared to the earlier indication. In other words, in case the UE indicated already to the access node that some CG PUSCH resources can be released for other purposes, the UE cannot claim those resources back.

Thus, methods for supporting a UE to indicate the unused CG PUSCH resource to an access node have been described. Such methods may be reliable and fast, and may allow the access node chance to reallocate unused resources for other uses, thereby improving the efficiency of the network.

In some examples, an apparatus comprises receiving, at a user equipment from an access node, a first message comprising information indicating configured grant uplink resources for performing uplink data transmission to the access node; receiving, at the user equipment from the access node, configuration information for transmitting a dynamic indication, the dynamic indication comprising information indicating unused configured grant uplink resources; obtaining information indicating a preferred subset of the configured grant uplink resources; based on the information indicating the configured grant uplink resources and the preferred subset, transmitting, from the user equipment to the access node, the uplink data; and transmitting, from the user equipment to the access node, the dynamic indication based on the configuration information.

In some examples the apparatus comprises at least one processor and at least one memory storing instructions that, when executed by the at least one processor, cause the apparatus at least to: receive, from an access node, a first message comprising information indicating configured grant uplink resources for performing uplink data transmission to the access node; receive, from the access node, configuration information for transmitting a dynamic indication, the dynamic indication comprising information indicating unused configured grant uplink resources; obtain information indicating a preferred subset of the configured grant uplink resources; based on the information indicating the configured grant uplink resources and the preferred subset, transmit, to the access node, the uplink data; and transmit, to the access node, the dynamic indication based on the configuration information.

In some examples, an apparatus comprises means for: transmitting, from an access node to a user equipment, a first message comprising information indicating configured grant uplink resources for the user equipment to perform uplink data transmission to the access node; transmitting, from the access node to the user equipment, configuration information for causing the user equipment to transmit a dynamic indication, the dynamic indication comprising information indicating unused configured grant uplink resources; providing, to the user equipment, information indicating a preferred subset of the configured grant uplink resources; receiving, from the user equipment at the access node, the uplink data based on the information indicating the configured grant uplink resources and the preferred subset; and receiving, from the user equipment at the access node, the dynamic indication based on the configuration information.

In some examples, the apparatus comprises at least one processor and at least one memory storing instructions that, when executed by the at least one processor, cause the apparatus at least to: transmit, to a user equipment, a first message comprising information indicating configured grant uplink resources for the user equipment to perform uplink data transmission to an access node; transmit, to the user equipment, configuration information for causing the user equipment to transmit a dynamic indication, the dynamic indication comprising information indicating unused configured grant uplink resources; provide, to the user equipment, information indicating a preferred subset of the configured grant uplink resources; receive, from the user equipment, the uplink data based on the information indicating the configured grant uplink resources and the preferred subset; and receive, from the user equipment, the dynamic indication based on the configuration information.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>", and "one or more of: <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory storing instructions that, when executed by the at least one processor, cause the apparatus at least to:

receive, from an access node, an information indicating configured grant uplink resources for performing uplink data transmission to the access node;

receive, from the access node, configuration information indicating a number of bits;

transmit, to the access node, a dynamic indication comprising a bitmap of a length specified by the number of bits indicated by the configuration information, said bitmap indicating subsequent configured grant uplink resources which the apparatus will not use as unused configured uplink grant resources; and transmit, to the access node, a new dynamic indication comprising a new bitmap of the length specified by the number of bits indicated by the configuration information, said new bitmap indicating subsequent configured grant uplink resources which the apparatus will not use as unused configured uplink grant resources, wherein, when the bitmap and the new bitmap refer to a common subsequent configured grant uplink resource, and when the common subsequent configured grant uplink resource is indicated as an unused uplink grant resource in the bitmap, then the common subsequent configured grant uplink resource is also indicated as an unused uplink grant resource in the new bitmap, such that the new dynamic indication does not claim back unused configured grant uplink resources.

2. The apparatus of claim 1, wherein the configuration information can be received at any time within or outside of a configured grant cycle.

3. The apparatus of claim 2, wherein receipt of the configuration information prompts the apparatus to transmit the dynamic indication in the form of a bitmap for n subsequent configured grant uplink resources, wherein n is the number of bits indicated by the configuration information.

4. The apparatus of claim 1, wherein the dynamic indication covers a reporting window during which the apparatus transmits, for each configured grant uplink resource within the reporting window, a bit of the bitmap to indicate whether the apparatus will not use the respective configured grant uplink resource.

5. The apparatus of claim 4, wherein receipt of the configuration information triggers the UE to provide a sliding reporting window comprising a dynamic indication with each uplink data transmission of the configured grant uplink resources.

6. The apparatus of claim 5, wherein a subsequent dynamic indication which overlaps a previous dynamic indication, overwrites the previous dynamic indication.

7. The apparatus of claim 1, wherein the dynamic indication further comprises information indicating that additional resources are needed for uplink data transmission.

8. The apparatus of claim 1, wherein the configuration information comprises information indicating one or more of:

a priority level of the dynamic indication;

a beta-offset for multiplexing the dynamic indication with configured grant physical uplink shared channel;

repetition of the dynamic indication over multiple configured grant physical uplink shared channel resources;

no skipping for the first configured grant physical uplink shared channel resource; or that a subsequent dynamic indication can overwrite a previous dynamic indication.

9. The apparatus of claim 1, wherein the apparatus is further caused to:

obtain information indicating a preferred subset of the configured grant uplink resources, and transmit, to the access node, uplink data based on the information indicating the configured grant uplink resources and the preferred subset.

10. The apparatus of claim 9, wherein the information indicating the preferred subset comprises information indicating which configured grant resources the user equipment may select when the user equipment requires less than the total number of allocated configured grant resources.

11. The apparatus of claim 9, wherein the information indicating the preferred subset comprises information indicating that the preferred subset comprises the first N resources or that the preferred subset does not comprise the last M resources.

12. The apparatus of claim 9, wherein obtaining the information indicating the preferred subset of the configured grant uplink resources comprises receiving, from the access node, the information indicating the preferred subset of the configured grant uplink resources.

13. The apparatus of claim 1, wherein the apparatus is further caused to:

determine the number of configured grant resources required for the uplink data transmission; and determine the dynamic indication based on the determined number of configured grant resources required for the uplink data transmission.

14. An apparatus comprising at least one processor and at least one memory storing instructions that, when executed by the at least one processor, cause the apparatus at least to:

transmit, to a user equipment, an information indicating configured grant uplink resources for the user equipment to perform uplink data transmission to the access node;

transmit, to the user equipment, configuration information indicating a number of bits;

receive, from the user equipment, a dynamic indication comprising a bitmap of a length specified by the number of bits indicated by the configuration information, said bitmap indicating subsequent configured grant uplink resources which the user equipment will not use as unused configured uplink grant resources; and receive, from the user equipment, a new dynamic indication comprising a new bitmap of the length specified by the number of bits indicated by the configuration information, said new bitmap indicating subsequent configured grant uplink resources which the user equipment will not use as unused configured uplink grant resources, wherein, when the bitmap and the new bitmap refer to a common subsequent configured grant uplink resource, and when the common subsequent configured grant uplink resource is indicated as an unused uplink grant resource in the bitmap, then the common subsequent configured grant uplink resource is also indicated as an unused uplink grant resource in the new bitmap, such that the new dynamic indication does not claim back unused configured grant uplink resources.

15. The apparatus of claim 14, wherein the configuration information can be received at any time within or outside of a configured grant cycle.

16. The apparatus of claim 15, wherein receipt of the configuration information prompts the apparatus to transmit the dynamic indication in the form of a bitmap for n subsequent configured grant uplink resources, wherein n is the number of bits indicated by the configuration information.

17. The apparatus of claim 14, wherein the dynamic indication covers a reporting window during which the apparatus transmits, for each configured grant uplink resource within the reporting window, a bit of the bitmap to indicate whether the apparatus will not use the respective configured grant uplink resource.

18. The apparatus of claim 17, wherein receipt of the configuration information triggers the UE to provide a sliding reporting window comprising a dynamic indication with each uplink data transmission of the configured grant uplink resources.

19. The apparatus of claim 18, wherein a subsequent dynamic indication, which overlaps a previous dynamic indication, overwrites the previous dynamic indication.

20. The apparatus of claim 14, wherein the dynamic indication further comprises information indicating that additional resources are needed for uplink data transmission.

21. The apparatus of claim 14, wherein the configuration information comprises information indicating one or more of:

a priority level of the dynamic indication;

a beta-offset for multiplexing the dynamic indication with configured grant physical uplink scheduled control channel information;

repetition of the dynamic indication over multiple configured grant physical uplink scheduled control channel resources;

no skipping for the first configured grant physical uplink scheduled control channel resource; or that a subsequent dynamic indication can overwrite a previous dynamic indication.

22. The apparatus of claim 14, wherein the apparatus is further caused to:

provide, to the user equipment, information indicating a preferred subset of the configured grant uplink resources, and receive, from the user equipment, uplink data based on the information indicating the configured grant uplink resources and the preferred subset.

23. The apparatus of claim 22, wherein the information indicating the preferred subset comprises information indicating which configured grant resources the user equipment may select when the user equipment requires less than the total number of allocated configured grant resources.

24. The apparatus of claim 22, wherein the information indicating the preferred subset comprises information indicating that the preferred subset comprises the first N resources or that the preferred subset does not comprise the last M resources.

25. The apparatus of claim 14, wherein the apparatus is further caused to:

determine, based on the dynamic indication, whether any of the configured grant uplink resources are not being used by the user equipment; and reallocate one or more of the configured grant uplink resources that are determined as not being used by the user equipment for other usage.

26. A method comprising, by a user equipment:

receiving, from an access node, an information indicating configured grant uplink resources for performing uplink data transmission to the access node;

receiving, from the access node, configuration information indicating a number of bits;

transmitting, to the access node, a dynamic indication comprising a bitmap of a length specified by the number of bits indicated by the configuration information, said bitmap indicating subsequent configured grant uplink resources which the user equipment will not use as unused configured uplink grant resources; and transmitting, to the access node, a new dynamic indication comprising a new bitmap of the length specified by the number of bits indicated by the configuration information, said new bitmap indicating subsequent configured grant uplink resources which the user equipment will not use as unused configured uplink grant resources, wherein, when the bitmap and the new bitmap refer to a common subsequent configured grant uplink resource, and when the common subsequent configured grant uplink resource is indicated as an unused uplink grant resource in the bitmap, then the common subsequent configured grant uplink resource is also indicated as an unused uplink grant resource in the new bitmap, such that the new dynamic indication does not claim back unused configured grant uplink resources.

27. A method comprising, by an access node:

transmitting, to a user equipment, an information indicating configured grant uplink resources for the user equipment to perform uplink data transmission to the access node;

transmitting, to the user equipment, configuration information indicating a number of bits;

receiving, from the user equipment, a dynamic indication comprising a bitmap of a length specified by the number of bits indicated by the configuration information, said bitmap indicating subsequent configured grant uplink resources which the user equipment will not use as unused configured uplink grant resources; and receiving, from the user equipment, a new dynamic indication comprising a new bitmap of the length specified by the number of bits indicated by the configuration information, said new bitmap indicating subsequent configured grant uplink resources which the user equipment will not use as unused configured uplink grant resources, wherein, when the bitmap and the new bitmap refer to a common subsequent configured grant uplink resource, and when the common subsequent configured grant uplink resource is indicated as an unused uplink grant resource in the bitmap, then the common subsequent configured grant uplink resource is also indicated as an unused uplink grant resource in the new bitmap, such that the new dynamic indication does not claim back unused configured grant uplink resources.

* * * * *